United States Patent
Wang

(10) Patent No.: US 9,891,390 B2
(45) Date of Patent: Feb. 13, 2018

(54) FIBER OPTIC CONNECTOR ASSEMBLY AND METHOD FOR MANUFACTURING THE SAME

(71) Applicant: ADC Telecommunications (Shanghai) Distribution Co., Ltd., Shanghai (CN)

(72) Inventor: Liming Wang, Shanghai (CN)

(73) Assignee: ADC Telecommunications (Shanghai) Distribution Co., Ltd., Shanghai (CN)

( * ) Notice: Subject to any disclaimer, the term of this patent is extended or adjusted under 35 U.S.C. 154(b) by 0 days.

(21) Appl. No.: 15/035,461

(22) PCT Filed: Nov. 4, 2014

(86) PCT No.: PCT/IB2014/065788
§ 371 (c)(1),
(2) Date: May 9, 2016

(87) PCT Pub. No.: WO2015/068103
PCT Pub. Date: May 14, 2015

(65) Prior Publication Data
US 2016/0291258 A1    Oct. 6, 2016

(30) Foreign Application Priority Data
Nov. 7, 2013    (CN) .................. 2013 1 05471181

(51) Int. Cl.
*G02B 6/38* (2006.01)

(52) U.S. Cl.
CPC .......... *G02B 6/387* (2013.01); *G02B 6/3821* (2013.01); *G02B 6/3843* (2013.01);
(Continued)

(58) Field of Classification Search
CPC .. G02B 6/3885; G02B 6/3893; G02B 6/3887; G02B 6/3825; G02B 6/3821; G02B 6/387
See application file for complete search history.

(56) References Cited

U.S. PATENT DOCUMENTS

| 7,233,731 B2* | 6/2007 | Solheid ............... G02B 6/3849 385/135 |
| 9,195,010 B2* | 11/2015 | Shimazu .............. G02B 6/3817 |
| 2013/0223801 A1 | 8/2013 | Bhagavatula et al. |

FOREIGN PATENT DOCUMENTS

| CN | 104635304 | 5/2015 |
| WO | WO 2013/126429 | 8/2013 |

OTHER PUBLICATIONS

International Search Report for International Application No. PCT/IB2014/065788 dated Jan. 29, 2015 (2 pages).

* cited by examiner

*Primary Examiner* — Jennifer Doan
(74) *Attorney, Agent, or Firm* — Merchant & Gould P.C.

(57) ABSTRACT

A method for manufacturing a fiber optic connector assembly, comprising: providing a ferrule having a first fiber and a cable having a second fiber; adjusting the ferrule to locate the first fiber at a first predetermined orientation, and adjusting the cable to locate the second fiber at a second predetermined orientation; and inserting the first fiber located at the first predetermined orientation and the second fiber located at the second predetermined orientation into a alignment tool received in a housing of a fiber optic connector. Wherein the first and second predetermined orientations are set so that a distance between a center of a fiber core of the first fiber and a center of a fiber core of the second fiber is equal to an absolute value of a difference between a distance from a center of a coat layer to the center of the fiber core of the first fiber and a distance from a center of a coat layer to the center of the fiber core of the second fiber when the first fiber located at the first predetermined orientation and the second fiber located at the second predetermined orientation are inserted into the alignment tool.

29 Claims, 5 Drawing Sheets

(52) U.S. Cl.
CPC ......... *G02B 6/3846* (2013.01); *G02B 6/3861* (2013.01); *G02B 6/3865* (2013.01); *G02B 6/3881* (2013.01); *G02B 6/3887* (2013.01); *G02B 6/3803* (2013.01); *G02B 6/3851* (2013.01)

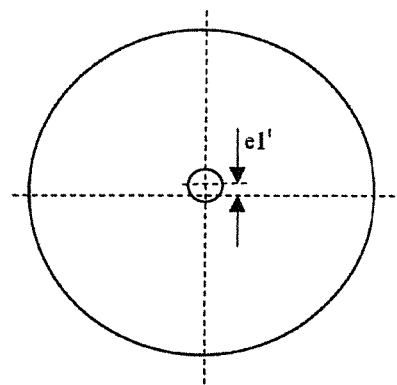 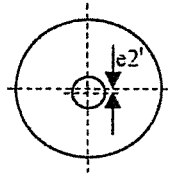 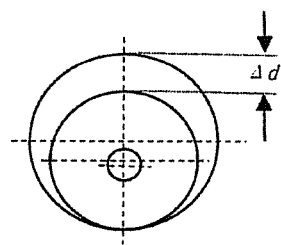
Fig.1A　　　　　　　Fig.1B　　　　　　　Fig.1C
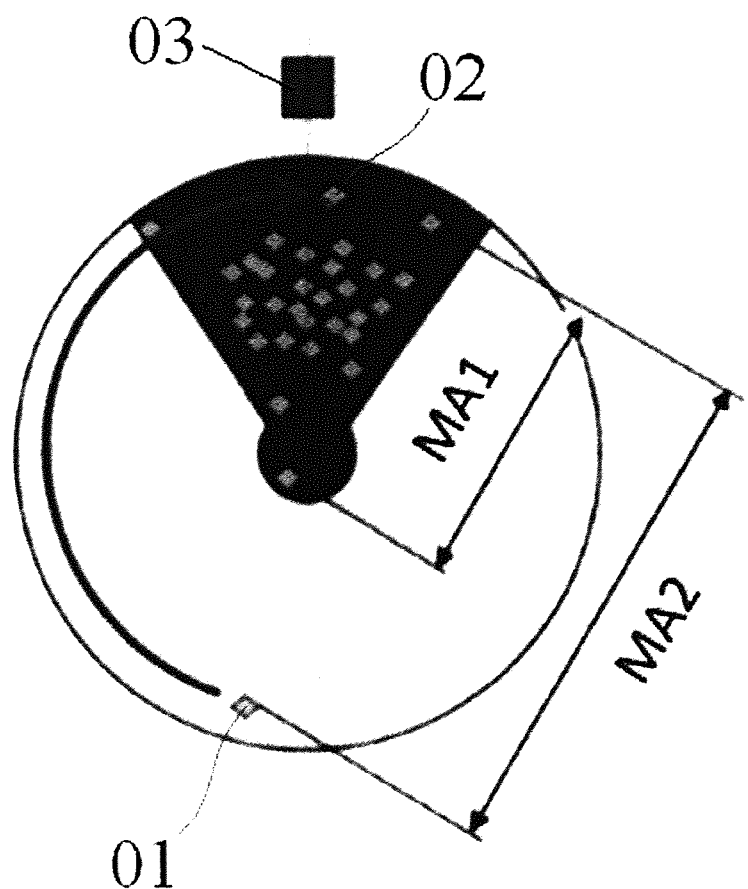
Fig.2

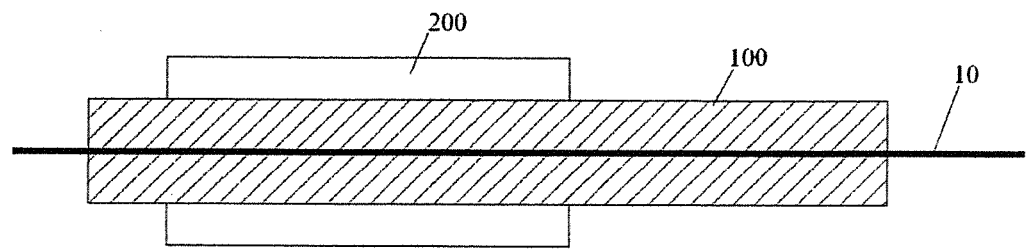
Fig.3
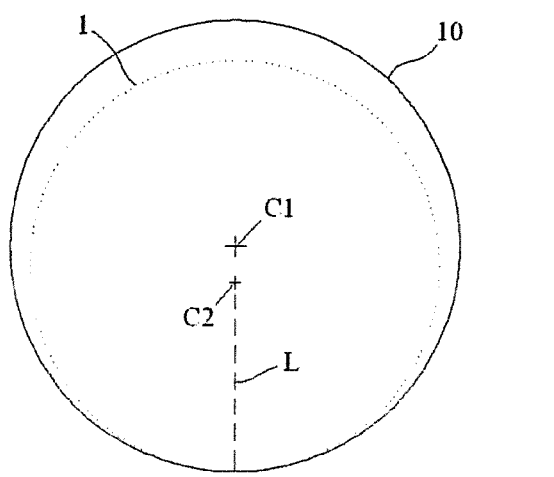 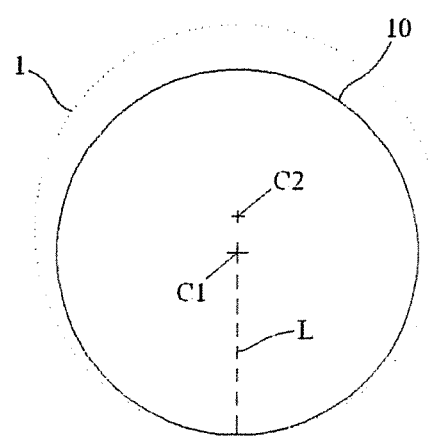
Fig.4A  Fig.4B
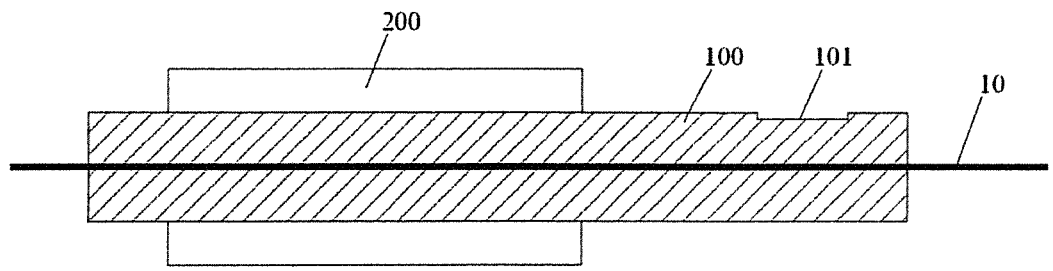
Fig.5

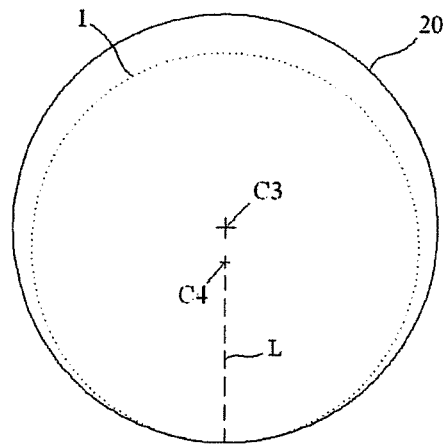
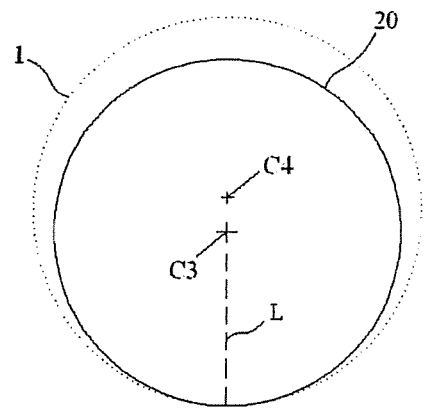
Fig.9A    Fig.9B
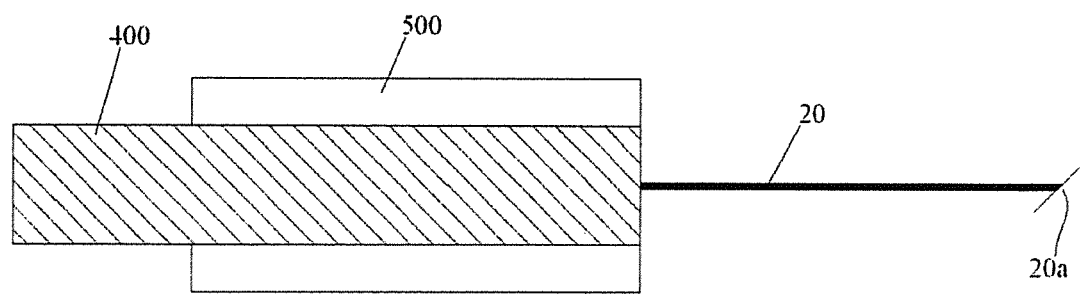
Fig.10
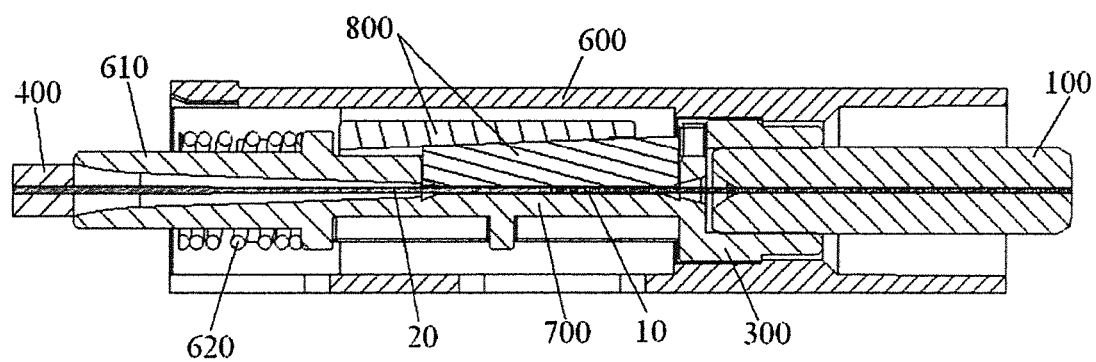
Fig.11

FIBER OPTIC CONNECTOR ASSEMBLY AND METHOD FOR MANUFACTURING THE SAME

CROSS-REFERENCE TO RELATED APPLICATION

This application is a National Stage of PCT/IB2014/065788 filed 4 Nov. 2014, which claims the benefit of Chinese Patent Application No. 201310547118.1 filed on Nov. 7, 2013 in the State Intellectual Property Office of China and which applications are incorporated herein by reference To the extent appropriate, a claim of priority is made to each of the above disclosed applications.

BACKGROUND OF THE INVENTION

Field of the Invention

The present invention relates to a method for manufacturing a fiber optic connector assembly and a fiber optic connector assembly manufactured by the method.

Description of the Related Art

The insertion loss of a fiber optic connector is mainly depended on surface polishing quality of an optical fiber to be connected and offset of a fiber core of the optical fiber. The present invention is focused on reducing the offset of the fiber core. During assembling a fiber optic connector, the offset of the fiber core is mainly determined by following three factors: (1) an eccentricity $e1'$ between a bore of a fiber optic ferrule and an outer circumferential surface of the fiber optic ferrule (see FIG. 1A); (2) an eccentricity $e2'$ between the fiber core and the coat layer of the optical fiber (see FIG. 1B); (3) a difference $\Delta d$ between a diameter of the optical fiber and a diameter of the bore of the fiber optic ferrule (see FIG. 1C). In the above three factors, the eccentricity $e2'$ between the fiber core and the coat layer of the optical fiber has a least effect on the insertion loss of the fiber optic connector.

In prior art, a fiber optic connector assembly having a low insertion loss is generally manufactured by a high precision fiber optical ferrule and by manually adjusting the offset of the fiber core of the optical fiber. In the case of adopting the high precision fiber optical ferrule, please refer to FIGS. 1A, 1B and 1C, it is necessary to reduce the eccentricity $e1'$ between the bore of the fiber optic ferrule and the outer circumferential surface of the fiber optic ferrule (see FIG. 1A) and the difference $\Delta d$ between the diameter of the optical fiber and the diameter of the bore of the fiber optic ferrule (see FIG. 1C), so as to reduce the offset of the fiber core of the optical fiber with respect to the outer circumferential surface of the fiber optic ferrule. In this case, however, it greatly increases the cost of the fiber optic connector, and it becomes very difficult to insert the optical fiber into the bore of the fiber optic ferrule. In the case of adopting a manufacturing process of adjusting the offset of the fiber core of the optical fiber, please refer to FIG. 2, the offset between the fiber cores of the optical fibers to be connected during coupling fiber optic connectors can be reduced by adjusting the centers of the fiber cores of the optical fibers into a specific angle zone (indicated by a black sector region in FIG. 2) corresponding to a key 03 (the key 03 is used as a mark for identifying the adjusting region of the optical fiber), for example, as shown in FIG. 2, adjusting the center of the fiber core of the optical fiber from a position 01 outside the black sector region into a position 02 within the black sector region. However, in this case, the fiber optic connectors must be adjusted before coupling. If the fiber optic connectors are not adjusted in advance, the offset between the fiber cores of the optical fibers is random and cannot be controlled. Furthermore, if the fiber optic connector is manufactured by a fiber optic ferrule with higher precision, it also increases the cost of the fiber optic connector and the difficulty to insert the optical fiber into the bore of the fiber optic ferrule.

In another Chinese patent application No. CN201310555118.6 filed by the inventor of the present invention, there is provided a method for manufacturing a fiber optic ferrule, wherein a center of a fiber core of an optical fiber is actively adjusted to accurately align to a center of a fiber optic ferrule. In this way, during matching a pair of fiber optic connectors, the offset between the centers of the fiber cores of the optical fibers connected by the pair of fiber optic connectors is reduced, greatly decreasing the insertion loss of the fiber optic connectors. Thereby, the whole disclosure of said patent application is incorporated herein by reference.

In the present application, the inventor uses the above pre-adjusted fiber optic ferrule with an optical fiber to further manufacture a mechanically coupled fiber optic connector assembly with a low insertion loss.

In the prior art, during manufacturing a fiber optic connector assembly in which a fiber fixed in a ferrule is optically coupled with a fiber of a cable, generally, the fiber fixed in the ferrule and the fiber of the cable are directly inserted into an alignment tool mounted in a housing of a fiber optic connector. However, the offset between the center of the fiber core of the fiber in the ferrule and the center of the fiber core of the fiber of the cable is random and cannot be controlled, that is, the offset between the centers of the fiber cores is randomly distributed in a range of a minimal offset MA1 to a maximal offset MA2, as shown in FIG. 2, the minimal offset MA1 is equal to a difference between an eccentricity of the fiber core of the fiber in the ferrule and an eccentricity of the fiber core of the fiber of the cable, and the maximal offset MA2 is equal to a sum of an eccentricity of the fiber core of the fiber in the ferrule and an eccentricity of the fiber core of the fiber of the cable. Thereby, the performance of the fiber optic connector assembly made by the method in the prior art is not stable and cannot always satisfy predetermined requirements. In order to satisfy predetermined requirements, in the prior art, it generally adopts a high precision cable and a high precision ferrule to manufacture the fiber optic connector assembly. However, as discussed above, it greatly increases the cost of the fiber optic connector assembly.

SUMMARY OF THE INVENTION

The present invention has been made to overcome or alleviate at least one aspect of the above mentioned disadvantages.

According to an object of the present invention, there is provided a method for manufacturing a fiber optic assembly, wherein by adjusting an eccentricity of a first fiber of a ferrule and an eccentricity of a second fiber of a cable to be coupled, an offset distance between the center of the fiber core of the first fiber and the center of the fiber core of the second fiber is controlled to be minimized, reducing the insertion loss of the fiber optic connector assembly.

According to an aspect of the present invention, there is provided a method for manufacturing a fiber optic connector assembly, comprising steps of:

S100: providing a ferrule having a first fiber and a cable having a second fiber;

S200: adjusting the ferrule to locate the first fiber at a first predetermined orientation, and adjusting the cable to locate the second fiber at a second predetermined orientation; and S300: inserting the first fiber located at the first predetermined orientation and the second fiber located at the second predetermined orientation into a alignment tool received in a housing of a fiber optic connector, wherein the first and second predetermined orientations are set so that a distance between a center of a fiber core of the first fiber and a center of a fiber core of the second fiber is equal to an absolute value of a difference between a distance from a center of a coat layer to the center of the fiber core of the first fiber and a distance from a center of a coat layer to the center of the fiber core of the second fiber when the first fiber located at the first predetermined orientation and the second fiber located at the second predetermined orientation are inserted into the alignment tool.

According to an exemplary embodiment of the present invention, the alignment tool is configured to an alignment tool with a V-typed alignment groove.

According to another exemplary embodiment of the present invention, when the first fiber located at the first predetermined orientation and the second fiber located at the second predetermined orientation are inserted into the V-typed alignment groove of the alignment tool, the center of the coat layer of the first fiber, the center of the fiber core of the first fiber, the center of the coat layer of the second fiber, and the center of the fiber core of the second fiber are located on a vertical line passing through a vertex of the V-typed alignment groove of the alignment tool.

According to another exemplary embodiment of the present invention, before the step S200, the method further comprises steps of:

S010: identifying the center of the coat layer of the first fiber, the center of the fiber core of the first fiber, a diameter of the coat layer of the first fiber, the center of the coat layer of the second fiber, the center of the fiber core of the second fiber, a diameter of the coat layer of the second fiber by means of an identification system; and S020: determining whether the diameter of the coat layer of the first fiber is larger than a first reference diameter, and determining whether the diameter of the coat layer of the second fiber is larger than a second reference diameter.

According to another exemplary embodiment of the present invention, if the diameter of the coat layer of the first fiber is larger than the first reference diameter, the first predetermined orientation is set so that the center of the fiber core of the first fiber is located just below the center of the coat layer of the first fiber on the vertical line.

According to another exemplary embodiment of the present invention, if the diameter of the coat layer of the first fiber is less than the first reference diameter, the first predetermined orientation is set so that the center of the fiber core of the first fiber is located just above the center of the coat layer of the first fiber on the vertical line.

According to another exemplary embodiment of the present invention, if the diameter of the coat layer of the second fiber is larger than the second reference diameter, the second predetermined orientation is set so that the center of the fiber core of the second fiber is located just below the center of the coat layer of the second fiber on the vertical line.

According to another exemplary embodiment of the present invention, if the diameter of the coat layer of the second fiber is less than the second reference diameter, the second predetermined orientation is set so that the center of the fiber core of the second fiber is located just above the center of the coat layer of the second fiber on the vertical line.

According to another exemplary embodiment of the present invention, after the first fiber is adjusted to the first predetermined orientation, fixing the ferrule by means of a first clamp, and forming a first mark for identifying the first predetermined orientation on the ferrule.

According to another exemplary embodiment of the present invention, after forming the first mark, providing a hub on an end of the ferrule which is to be coupled with the cable.

According to another exemplary embodiment of the present invention, the hub is formed on the ferrule by overmolding, or the hub is assembled on the ferrule by press-fitting.

According to another exemplary embodiment of the present invention, after the hub is provided on the ferrule, fixing the ferrule and cutting an end of the first fiber which is to be coupled with the second fiber.

According to another exemplary embodiment of the present invention, cutting the end of the first fiber to form a vertical flat end surface, or cutting the end of the first fiber to form a first slope end surface having a first angle with respect to the first mark.

According to another exemplary embodiment of the present invention, after the second fiber is adjusted to the second predetermined orientation, fixing the cable by means of a second clamp, and forming a second mark for identifying the second predetermined orientation on the cable.

According to another exemplary embodiment of the present invention, after forming the second mark, cutting an end of the second fiber to form a vertical flat end surface, or cutting the end of the second fiber to form a second slope end surface having a second angle with respect to the second mark, and the second slope end surface of the second fiber is adapted to match with a first slope end surface of the first fiber.

According to another exemplary embodiment of the present invention, after the first and second fibers both are inserted into the V-typed alignment groove of the alignment tool, fixing the first and second fibers in the V-typed alignment groove with a curable adhesive having an optical property matching with that of the first and second fibers.

According to another exemplary embodiment of the present invention, the curable adhesive is an ultraviolet curable adhesive.

According to an aspect of the present invention, there is provided a fiber optic connector assembly, comprising: a housing; a ferrule provided with a first fiber and mounted in the housing at one side of the housing; and a cable provided with a second fiber and mounted in the housing at the other side of the housing. The first fiber is coupled with the second fiber by an alignment tool mounted in the housing. Before inserting the first and second fibers into the alignment tool, the first fiber is adjusted to a first predetermined orientation, and the second fiber is adjusted to a second predetermined orientation. The first and second predetermined orientations are set so that a distance between a center of a fiber core of the first fiber and a center of a fiber core of the second fiber is equal to an absolute value of a difference between a distance from a center of a coat layer to the center of the fiber core of the first fiber and a distance from a center of a coat layer to the center of the fiber core of the second fiber when the first fiber located at the first predetermined orientation and the second fiber located at the second predetermined orientation are inserted into the alignment tool.

According to an exemplary embodiment of the present invention, the fiber optic connector assembly further comprises a tail tube and a spring, the cable is fixed in the tail tube, and the spring is constructed to press against the tail tube to exert an axial force.

According to another exemplary embodiment of the present invention, the alignment tool is configured to an alignment tool with a V-typed alignment groove.

According to another exemplary embodiment of the present invention, the fiber optic connector assembly further comprising: a positioning member placed on the V-typed alignment groove of the alignment tool to position the first and second fibers in the V-typed alignment groove of the alignment tool.

According to another exemplary embodiment of the present invention, the positioning member is fixed to the alignment tool by means of a mechanical fastener.

In the above various exemplary embodiments of the present invention, the first fiber of the ferrule and the second fiber of the cable are pre-adjusted to the first predetermined orientation and the second predetermined orientation, respectively, and then the first fiber and the second fiber are aligned with a V-groove alignment tool. In this way, the offset distance between the center of the fiber core of the first fiber and the center of the fiber core of the second fiber is controlled to be minimized, reducing the insertion loss of the fiber optic connector assembly.

BRIEF DESCRIPTION OF THE DRAWINGS

The above and other features of the present invention will become more apparent by describing in detail exemplary embodiments thereof with reference to the accompanying drawings, in which:

FIG. 1A is an illustrative view showing an eccentricity between a bore of a fiber optic ferrule and an outer circumferential surface of the fiber optic ferrule;

FIG. 1B is an illustrative view showing an eccentricity between a fiber core and a coat layer of an optical fiber;

FIG. 1C is an illustrative view showing a difference between a diameter of the optical fiber and a diameter of the bore of the fiber optic ferrule;

FIG. 2 is an illustrative principle view of adjusting a fiber core of a fiber optic connector;

FIG. 3 is an illustrative view of a fiber optic ferrule used in a fiber optic connector according to an exemplary embodiment of the present invention;

FIGS. 4A-4B are illustrative views of adjusting a first fiber inserted into a fiber optic ferrule to a first predetermined orientation, wherein FIG. 4A shows a coat layer of the first fiber with a diameter larger than a first reference diameter, and FIG. 4B shows a coat layer of the first fiber with a diameter less than the first reference diameter;

FIG. 5 is an illustrative view of forming a first mark for identifying the first predetermined orientation on the fiber optic ferrule;

FIGS. 9A-9B are illustrative views of adjusting the second fiber of the cable to a second predetermined orientation, wherein FIG. 9A shows a coat layer of the second fiber with a diameter larger than a second reference diameter, and FIG. 9B shows a coat layer of the second fiber with a diameter less than the second reference diameter;

FIG. 10 is an illustrative view of cutting an end of the second fiber to be coupled with the first fiber;

FIG. 11 is an illustrative view of a fiber optic connector assembly according to an exemplary embodiment of the present invention.

DETAILED DESCRIPTION OF PREFERRED EMBODIMENTS OF THE INVENTION

Figure 6:
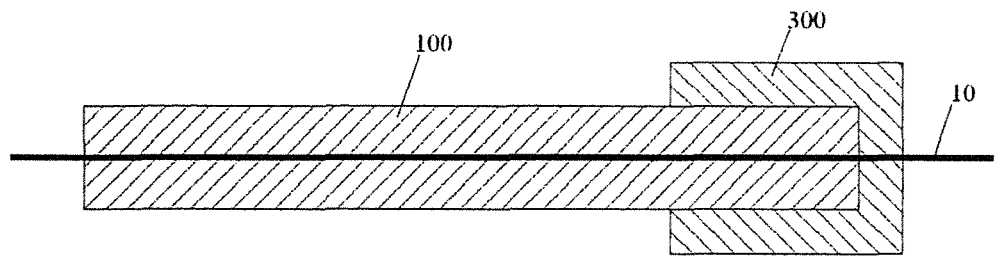
FIG. 6 is an illustrative view of providing a rub on the fiber optic ferrule.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to a general concept of the present invention, there is provided a method for manufacturing a fiber optic connector assembly, comprising: providing a ferrule having a first fiber and a cable having a second fiber; adjusting the ferrule to locate the first fiber at a first predetermined orientation, and adjusting the cable to locate the second fiber at a second predetermined orientation; and inserting the first fiber located at the first predetermined orientation and the second fiber located at the second predetermined orientation into a alignment tool received in a housing of a fiber optic connector. Wherein the first and second predetermined orientations are set so that a distance between a center of a fiber core of the first fiber and a center of a fiber core of the second fiber is equal to an absolute value of a difference between a distance from a center of a coat layer to the center of the fiber core of the first fiber and a distance from a center of a coat layer to the center of the fiber core of the second fiber when the first fiber located at the first predetermined orientation and the second fiber located at the second predetermined orientation are inserted into the alignment tool.

FIG. 3 is an illustrative view of a fiber optic ferrule 100 used in a fiber optic connector according to an exemplary embodiment of the present invention.

As shown in FIG. 3, a first fiber 10 is fixed in a bore of the ferrule 100. As described above, a center of a fiber core of the first fiber 10 is actively pre-adjusted to accurately align to a center of the ferrule 100.

Figure 8:
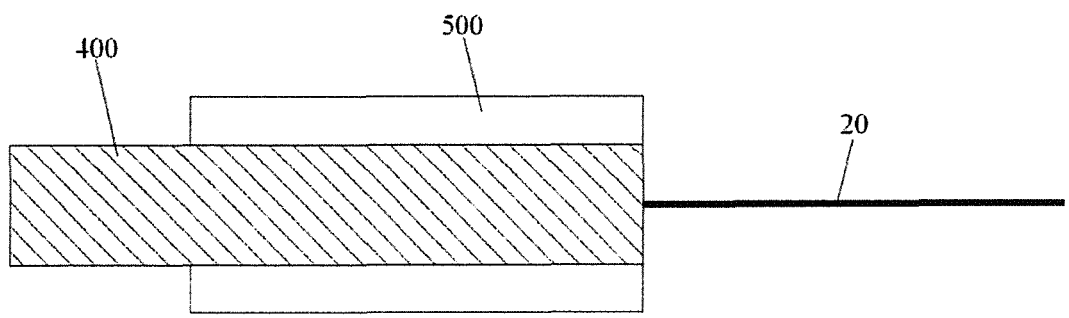
FIG. 8 is an illustrative view of an optical cable with a second fiber according to an exemplary embodiment of the present invention.

FIG. 8 is an illustrative view of an optical cable 400 with a second fiber 20 according to an exemplary embodiment of the present invention.

As shown in FIG. 8, the cable 400 has a second fiber 20 exposed from an end of the cable 400. The second fiber 20 is to be coupled with the first fiber 10.

FIG. 11 is an illustrative view of a fiber optic connector assembly according to an exemplary embodiment of the present invention.

As shown in FIG. 11, the fiber optic connector assembly mainly comprises a housing 600, a ferrule 100 as shown in FIG. 3 and a cable 400 as shown in FIG. 8. The ferrule 100 is mounted in the housing 600 at one side of the housing 600. The cable 400 is mounted in the housing 600 at the other side of the housing 600.

As shown in FIG. 11, the first fiber 10 of the ferrule 100 is aligned and coupled to the second fiber 20 of the cable 400 in an alignment tool 700 mounted in the housing 600.

In an exemplary embodiment, as shown in FIG. 11, the fiber optic connector assembly further comprises a tail tube 610 and a spring 620. The cable 400 is fixed in the tail tube 610. The spring 620 is mounted in the housing 600 and presses against the tail tube 610 to exert an axial spring force thereon. The tail tube 610 and the alignment tool 700 may be formed into one piece.

Figure 12:
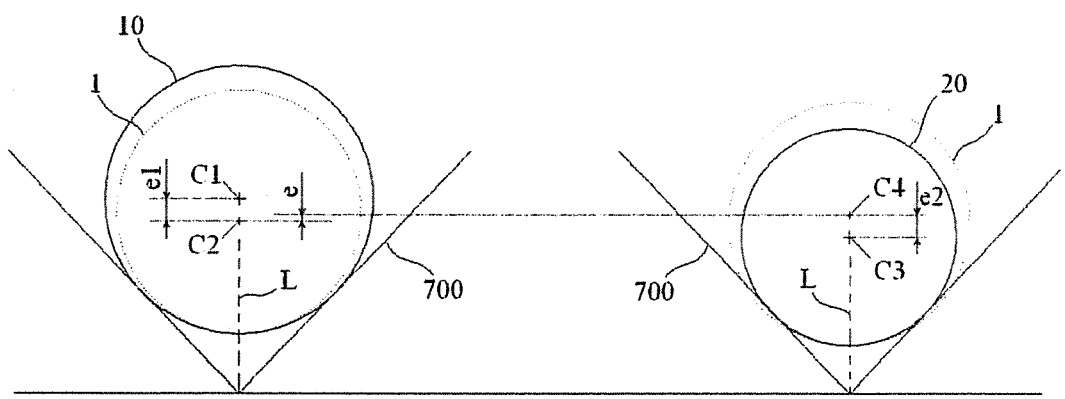
FIG. 12 is an illustrative view showing a distance between fiber cores of the first and second fibers positioned in a V-typed alignment groove and located at the first and second predetermined orientations, respectively.

In an exemplary embodiment, as shown in FIG. 12, the alignment tool 700 is configured to be an alignment tool with a V-typed alignment groove. But the present invention is not limited to this, the alignment tool 700 may be formed as an alignment sleeve or any other suitable alignment tool.

Referring to FIG. 11 again, the fiber optic connector assembly further comprises a positioning member 800 placed on the V-typed alignment groove of the alignment tool 700 to hold the first and second fibers 10, 20 in the V-typed alignment groove of the alignment tool 700. For example, the positioning member 800 may be formed as a cover placed on the V-typed alignment groove of the alignment tool 700. In an exemplary embodiment, the positioning member 800 may be fixed to the alignment tool 700 by means of a mechanical fastener. Before inserting the first and second fibers 10, 20 into the V-typed alignment groove of the alignment tool 700, the positioning member 800 is opened, and after the first and second fibers 10, 20 are inserted into the V-typed alignment groove of the alignment tool 700, the positioning member 800 is closed and press the first and second fibers 10, 20 in the V-typed alignment groove of the alignment tool 700 in place. Also, the positioning member 800 is further fixed to the alignment tool 700 with a curable adhesive (it will be described later) for firmly fixing the first and second fibers 10, 20 in the V-typed alignment groove.

Hereafter, it will describe in detail a process of manufacturing a fiber optic connector assembly according to an exemplary embodiment of the present invention, with reference to FIGS. 3-12.

Firstly, it will describe operation of adjusting the first fiber 10 of the ferrule 100 to the first predetermined orientation with reference to FIGS. 3-7.

As shown in FIG. 3, clamping the ferrule 100 by a first clamp 200, and identifying the center C1 (see FIGS. 4A-4B) of the coat layer of the first fiber 10, the center C2 (see FIGS. 4A-4B) of the fiber core of the first fiber 10, and a diameter of the coat layer of the first fiber 10 by means of an identification system, for example, an optical identification system.

After identifying the center C1 of the coat layer, the center C2 of the fiber core, and the diameter of the coat layer of the first fiber 10, determining whether the diameter of the coat layer of the first fiber 10 is larger than a first reference diameter (herein, the first reference diameter is set to be equal to a second reference diameter described later, and both are referred as the reference diameter).

FIGS. 4A-4B are illustrative views of adjusting the first fiber 10 inserted into the fiber optic ferrule 100 to the first predetermined orientation, wherein FIG. 4A shows a coat layer of the first fiber 10 with a diameter larger than a reference diameter of a reference fiber 1, and FIG. 4B shows a coat layer of the first fiber 10 with a diameter less than the reference diameter of the reference fiber 1.

As shown in FIG. 4A, if determining that the diameter of the coat layer of the first fiber 10 is larger than the reference diameter of the reference fiber 1, the first predetermined orientation is set so that the center C2 of the fiber core of the first fiber 10 and the center C1 of the coat layer of the first fiber 10 are located on a vertical line L, and the center C2 of the fiber core of the first fiber 10 is located just below the center C1 of the coat layer of the first fiber 10 on the vertical line L.

As shown in FIG. 4B, if determining that the diameter of the coat layer of the first fiber 10 is less than the reference diameter of the reference fiber 1, the first predetermined orientation is set so that the center C2 of the fiber core of the first fiber 10 and the center C1 of the coat layer of the first fiber 10 are located on a vertical line L, and the center C2 of the fiber core of the first fiber 10 is located just above the center C1 of the coat layer of the first fiber 10 on the vertical line L.

After adjusting the first fiber 10 to the first predetermined orientation, as shown in FIG. 5, fixing the ferrule 100 by means of the first clamp 200, and forming a first mark 101 for identifying the first predetermined orientation on the ferrule 100, wherein the first mark 101 may be a local flat plane formed on the ferrule 100 or a stamp printed on the ferrule 100.

After forming the first mark 101, as shown in FIG. 6, providing a hub 300 on an end of the ferrule 100 which is to be coupled with the cable 400, wherein the hub 300 may be formed on the ferrule 100 by over-molding, or the hub 300 may be assembled on the ferrule 100 by press-fitting.

Figure 7:
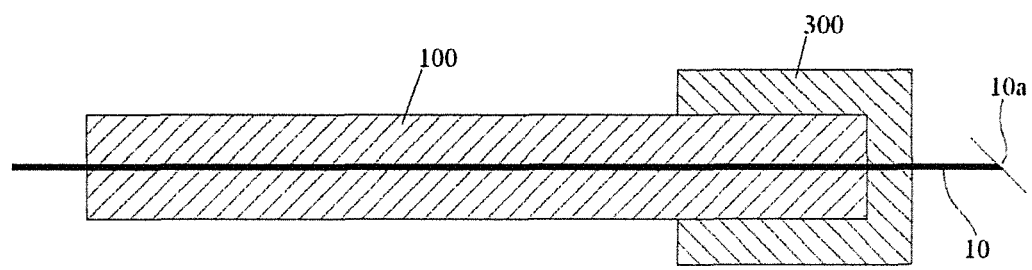
FIG. 7 is an illustrative view of cutting an end of the first fiber to be coupled with a second fiber.

After providing the hub 300 provided on the ferrule 100, fixing the ferrule 100 by the first clamp 200 or the hub 300, and cutting an end 10a of the first fiber 10 to be coupled with the second fiber 20. In an exemplary embodiment, the end 10a of the first fiber 10 is cut to form a vertical flat end surface with respect to the first mark 101. In another exemplary embodiment, as shown in FIG. 7, the end 10a of the first fiber 10 is cut to form a first slope end surface having a first angle with respect to the first mark 101. The first angle may be within a range of 8 degrees to 9 degrees, so as to achieve an angle plane contact (APC) between the first fiber 10 and the second fiber 20.

Secondly, it will describe operation of adjusting the second fiber 20 of the cable 400 to the second predetermined orientation with reference to FIGS. 8-10.

As shown in FIG. 8, clamping the cable 400 by a second clamp 500, and identifying the center C3 (see FIG. 9) of the coat layer of the second fiber 20, the center C4 (see FIG. 9) of the fiber core of the second fiber 20, and a diameter of the coat layer of the second fiber 20 by means of an identification system, for example, an optical identification system.

After identifying the center C3 of the coat layer, the center C4 of the fiber core, and the diameter of the coat layer of the second fiber 20, determining whether the diameter of the coat layer of the second fiber 20 is larger than a second reference diameter (herein, the first reference diameter is set to be equal to the second reference diameter, and both are referred as the reference diameter).

FIGS. 9A-9B are illustrative views of adjusting the second fiber 20 of the cable 400 to the second predetermined orientation, wherein FIG. 9A shows a coat layer of the second fiber 20 with a diameter larger than a reference diameter of a reference fiber 1, and FIG. 9B shows a coat layer of the second fiber 20 with a diameter less than the reference diameter of the reference fiber 1.

As shown in FIG. 9A, if determining that the diameter of the coat layer of the second fiber 20 is larger than the reference diameter of the reference fiber 1, the second predetermined orientation is set so that the center C4 of the fiber core of the second fiber 20 and the center C3 of the coat layer of the second fiber 20 are located on a vertical line L, and the center C4 of the fiber core of the second fiber 20 is located just below the center C3 of the coat layer of the second fiber 20 on the vertical line L.

As shown in FIG. 9B, if determining that the diameter of the coat layer of the second fiber 20 is less than the reference diameter of the reference fiber 1, the second predetermined orientation is set so that the center C4 of the fiber core of the second fiber 20 and the center C3 of the coat layer of the second fiber 20 are located on a vertical line L, and the center C4 of the fiber core of the second fiber 20 is located just above the center C3 of the coat layer of the second fiber 20 on the vertical line L.

After adjusting the second fiber 20 to the second predetermined orientation, as shown in FIG. 10, fixing the cable 400 by means of the second clamp 200, and forming a second mark (not shown) for identifying the second predetermined orientation on the cable 400, wherein the second mark may be a local flat plane formed on the cable 400 or a stamp printed on the cable 400.

After forming the second mark, as shown in FIG. 10, cutting an end 20*a* of the second fiber 20 to be coupled with the first fiber 10. In an exemplary embodiment, the end 20*a* of the second fiber 20 is cut to form a vertical flat end surface with respect to the second mark. In another exemplary embodiment, as shown in FIG. 10, the end 20*a* of the second fiber 20 is cut to form a second slope end surface having a second angle with respect to the second mark. The second angle may be within a range of 8 degrees to 9 degrees, so as to achieve an angle plane contact (APC) between the first fiber 10 and the second fiber 20. In this way, the second slope end surface of the second fiber 20 is adapted to match with the first slope end surface of the first fiber 10 during coupling the first and second fibers 10, 20.

After the first fiber 10 and the second fiber 20 are adjusted to the first predetermined orientation and the second predetermined orientation, respectively, the ferrule 100 and the cable 400 may be mounted in the housing 600. Please be noted that, during mounting the ferrule 100 and the cable 400 in the housing 600, it should keep the orientations of the ferrule 100 and the cable 400 unchanged, for example, it may be achieved by fixing them with the first clamp 200 and the second clamp 500.

FIG. 12 is an illustrative view showing a distance between fiber cores of the first and second fibers 10, 20 positioned in a V-typed alignment groove of the alignment tool 700 and located at the first and second predetermined orientations, respectively.

As shown in FIG. 12, after the first and second fibers 10, 20 located at the first and second predetermined orientations, respectively, are aligned and coupled to each other in the V-typed alignment groove of the alignment tool 700, the center C1 of the coat layer of the first fiber 10, the center C2 of the fiber core of the first fiber 10, the center C3 of the coat layer of the second fiber 20, the center C4 of the fiber core of the second fiber 20 are located on a vertical line L passing through a vertex of the V-typed alignment groove of the alignment tool 700.

Referring to FIG. 12 again, when the first and second fibers 10, 20 located at the first and second predetermined orientations, respectively, are aligned and coupled to each other in the V-typed alignment groove of the alignment tool 700, a distance e between the center C2 of the fiber core of the first fiber 10 and the center C4 of the fiber core of the second fiber 20 is equal to an absolute value of a difference between a distance e1 from the center C1 of the coat layer to the center C2 of the fiber core of the first fiber 10 and a distance e2 from the center C3 of the coat layer to the center C4 of the fiber core of the second fiber 20. In this way, the offset distance e between the center C2 of the fiber core of the first fiber 10 and the center C4 of the fiber core of the second fiber 20 is controlled to be minimized, reducing the insertion loss of the fiber optic connector assembly. However, in the prior art, the offset distance e' between the center of the fiber core of the first fiber and the center of the fiber core of the second fiber cannot be controlled and is randomly distributed in the range of the minimal offset MA1 to the maximal offset MA2, as shown in FIG. 2. Instead, according to the above embodiments of the present invention, the offset distance e between the center C2 of the fiber core of the first fiber 10 and the center C4 of the fiber core of the second fiber 20 always can be controlled to be equal to the minimal offset, as shown in FIG. 12.

After the first and second fibers 10, 20 both are inserted into the V-typed alignment groove of the alignment tool 700, the first and second fibers 10, 20 in the V-typed alignment groove is fixed with a curable adhesive having an optical property matching with that of the first and second fibers 10, 20. At the same time, the positioning member 800 is finally fixed to the alignment tool 700 with the curable adhesive. In an exemplary embodiment, the curable adhesive may be an ultraviolet curable adhesive.

In the above various exemplary embodiments of the present invention, the first fiber of the ferrule and the second fiber of the cable are pre-adjusted to the first predetermined orientation and the second predetermined orientation, respectively, and then the first fiber and the second fiber are aligned with a V-groove alignment tool. In this way, the offset distance between the center of the fiber core of the first fiber and the center of the fiber core of the second fiber is controlled to be minimized, reducing the insertion loss of the fiber optic connector assembly. Furthermore, the method disclosed herein can also be used to manufacture any other suitable fiber optic connector device in addition to the fiber optic connector product described herein. Moreover, the method disclosed herein can simplify the manufacture process, achieve the automation production, and improve the quality and conformity of the fiber optic connector products. It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A method for manufacturing a fiber optic connector assembly, comprising steps of:
    S100: providing a ferrule (100) having a first fiber (10) and a cable (400) having a second fiber (20);
    S200: adjusting the ferrule (100) to locate the first fiber (10) at a first predetermined orientation, and adjusting the cable (400) to locate the second fiber (20) at a second predetermined orientation; and
    S300: inserting the first fiber (10) located at the first predetermined orientation and the second fiber (20) located at the second predetermined orientation into an alignment tool (700) received in a housing (600) of a fiber optic connector,
    wherein the first and second predetermined orientations are set so that a distance (e) between a center (C2) of a fiber core of the first fiber (10) and a center (C4) of a fiber core of the second fiber (20) is equal to an absolute value of a difference between a distance (e1) from a center (C1) of a coat layer to the center (C2) of the fiber core of the first fiber (10) and a distance (e2) from a center (C3) of a coat layer to the center (C4) of the fiber core of the second fiber (20) when the first fiber (10) located at the first predetermined orientation and the second fiber (20) located at the second predetermined orientation are inserted into the alignment tool (700).

2. The method according to claim 1,
    wherein the alignment tool (700) is configured to an alignment tool with a V-typed alignment groove.

3. The method according to claim 2, wherein
    when the first fiber (10) located at the first predetermined orientation and the second fiber (20) located at the second predetermined orientation are inserted into the V-typed alignment groove of the alignment tool (700), the center (C1) of the coat layer of the first fiber (10), the center (C2) of the fiber core of the first fiber (10), the center (C3) of the coat layer of the second fiber (20), and the center (C4) of the fiber core of the second fiber (20) are located on a vertical line (L) passing through a vertex of the V-typed alignment groove of the alignment tool (700).

4. The method according to claim 3, wherein before the step S200, wherein the method further comprises steps of:
    S010: identifying the center (C1) of the coat layer of the first fiber (10), the center (C2) of the fiber core of the first fiber (10), a diameter of the coat layer of the first fiber (10), the center (C3) of the coat layer of the second fiber (20), the center (C4) of the fiber core of the second fiber (20), a diameter of the coat layer of the second fiber (20) by means of an identification system; and
    S020: determining whether the diameter of the coat layer of the first fiber (10) is larger than a first reference diameter, and determining whether the diameter of the coat layer of the second fiber (20) is larger than a second reference diameter.

5. The method according to claim 4, wherein
    if the diameter of the coat layer of the first fiber (10) is larger than the first reference diameter, the first predetermined orientation is set so that the center (C2) of the fiber core of the first fiber (10) is located just below the center (C1) of the coat layer of the first fiber (10) on the vertical line (L).

6. The method according to claim 5, wherein
    if the diameter of the coat layer of the first fiber (10) is less than the first reference diameter, the first predetermined orientation is set so that the center (C2) of the fiber core of the first fiber (10) is located just above the center (C1) of the coat layer of the first fiber (10) on the vertical line (L).

7. The method according to claim 4, wherein
    if the diameter of the coat layer of the second fiber (20) is larger than the second reference diameter, the second predetermined orientation is set so that the center (C4) of the fiber core of the second fiber (20) is located just below the center (C3) of the coat layer of the second fiber (20) on the vertical line (L).

8. The method according to claim 7, wherein
    if the diameter of the coat layer of the second fiber (20) is less than the second reference diameter, the second predetermined orientation is set so that the center (C4) of the fiber core of the second fiber (20) is located just above the center (C3) of the coat layer of the second fiber (20) on the vertical line (L).

9. The method according to claim 6, wherein
    after adjusting the first fiber (10) to the first predetermined orientation, fixing the ferrule (100) by means of a first clamp (200), and forming a first mark (101) for identifying the first predetermined orientation on the ferrule (100).

10. The method according to claim 9, wherein
    after forming the first mark (101), providing a hub (300) on an end of the ferrule (100) which is to be coupled with the cable (400).

11. The method according to claim 10, wherein
    the hub (300) is formed on the ferrule (100) by overmolding, or
    the hub (300) is assembled on the ferrule (100) by press-fitting.

12. The method according to claim 11, wherein
    after providing the hub (300) on the ferrule (100), fixing the ferrule (100) and cutting an end (10a) of the first fiber (10) which is to be coupled with the second fiber (20).

13. The method according to claim 12, wherein
    cutting the end (10a) of the first fiber (10) to form a vertical flat end surface, or cutting the end (10a) of the first fiber (10) to form a first slope end surface having a first angle with respect to the first mark (101).

14. The method according to claim 8, wherein
    after adjusting the second fiber (20) the second predetermined orientation, fixing the cable (400) by means of a second clamp (500), and forming a second mark for identifying the second predetermined orientation on the cable (400).

15. The method according to claim 14, wherein
    after forming the second mark, cutting an end (20a) of the second fiber (20) to form a vertical flat end surface, or cutting the end (20a) of the second fiber (20) to form a second slope end surface having a second angle with respect to the second mark, and the second slope end surface of the second fiber (20) is adapted to match with a first slope end surface of the first fiber (10).

16. The method according to claim 2, wherein
    after the first and second fibers (10, 20) both are inserted into the V-typed alignment groove of the alignment tool (700), fixing the first and second fibers (10, 20) in the V-typed alignment groove with a curable adhesive having an optical property matching with that of the first and second fibers (10, 20).

17. The method according to claim 16, wherein the curable adhesive is an ultraviolet curable adhesive.

18. A fiber optic connector assembly, comprising:
a housing (600); and
a ferrule (100), provided with a first fiber (10) and mounted in the housing (600) at one side of the housing (600); and
a cable (400) provided with a second fiber (20) and mounted in the housing (600) at the other side of the housing (600),
wherein the first fiber (10) is coupled with the second fiber (20) by an alignment tool (700) mounted in the housing (600),
wherein before inserting the first and second fibers (10, 20) into the alignment tool (700), the first fiber (10) is adjusted to a first predetermined orientation, and the second fiber (20) is adjusted to a second predetermined orientation, and
wherein the first and second predetermined orientations are set so that a distance (e) between a center (C2) of a fiber core of the first fiber (10) and a center (C4) of a fiber core of the second fiber (20) is equal to an absolute value of a difference between a distance (e1) from a center (C1) of a coat layer to the center (C2) of the fiber core of the first fiber (10) and a distance (e2) from a center (C3) of a coat layer to the center (C4) of the fiber core of the second fiber (20) when the first fiber (10) located at the first predetermined orientation and the second fiber (20) located at the second predetermined orientation are inserted into the alignment tool (700).

19. The fiber optic connector assembly according to claim 18, further comprising:
a tail tube (610) constructed to fix the cable (400) therein; and
a spring (620) constructed to press against the tail tube (610) to exert an axial force.

20. The fiber optic connector assembly according to claim 18,
wherein the alignment tool (700) is configured to an alignment tool with a V-typed alignment groove.

21. The fiber optic connector assembly according to claim 20, further comprising:
a positioning member (800) placed on the V-typed alignment groove of the alignment tool (700) to position the first and second fibers (10, 20) in the V-typed alignment groove of the alignment tool (700).

22. The fiber optic connector assembly according to claim 21,
wherein the positioning member (800) is fixed to the alignment tool (700) by means of a mechanical fastener.

23. The fiber optic connector assembly according to claim 20, wherein
the first fiber (10) located at the first predetermined orientation and the second fiber (20) located at the second predetermined orientation are inserted into the V-typed alignment groove of the alignment tool (700), and the center (C1) of the coat layer of the first fiber (10), the center (C2) of the fiber core of the first fiber (10), the center (C3) of the coat layer of the second fiber (20), and the center (C4) of the fiber core of the second fiber (20) are located on a vertical line (L) passing through a vertex of the V-typed alignment groove of the alignment tool (700).

24. The fiber optic connector assembly according to claim 18, wherein
a first mark (101) for identifying the first predetermined orientation is formed on the ferrule (100).

25. The fiber optic connector assembly according to claim 24, wherein
an end (10a) of the first fiber (10) is form as a vertical flat end surface or a first slope end surface having a first angle with respect to the first mark (101).

26. The fiber optic connector assembly according to claim 25, wherein
a second mark for identifying the second predetermined orientation is formed on the cable (400).

27. The fiber optic connector assembly according to claim 26, wherein
an end (20a) of the second fiber (20) is form as a vertical flat end surface or a second slope end surface having a second angle with respect to the second mark, and the second slope end surface of the second fiber (20) is adapted to match with the first slope end surface of the first fiber (10).

28. The fiber optic connector assembly according to claim 22, wherein
the first and second fibers (10, 20) are fixed in the V-typed alignment groove with a curable adhesive having an optical property matching with that of the first and second fibers (10, 20).

29. The fiber optic connector assembly according to claim 28, wherein the curable adhesive comprises an ultraviolet curable adhesive.

* * * * *